US011322015B1

(12) United States Patent
Parampottil et al.

(10) Patent No.: US 11,322,015 B1
(45) Date of Patent: May 3, 2022

(54) PROACTIVE INVESTIGATION ALERT SYSTEMS AND METHODS FOR MULTIPLE CONTROLLED-ENVIRONMENT FACILITIES

(71) Applicant: Securus Technologies, LLC, Carrollton, TX (US)

(72) Inventors: Isaac Parampottil, Coppell, TX (US); Christopher Barrett Bruton, Frisco, TX (US)

(73) Assignee: Securus Technologies, LLC, Carrollton, TX (US)

( * ) Notice: Subject to any disclaimer, the term of this patent is extended or adjusted under 35 U.S.C. 154(b) by 0 days.

(21) Appl. No.: 17/004,694

(22) Filed: Aug. 27, 2020

(51) Int. Cl.
*G08B 29/00* (2006.01)
*G08B 25/00* (2006.01)
*H04W 4/029* (2018.01)
*H04W 64/00* (2009.01)
*H04W 24/08* (2009.01)

(52) U.S. Cl.
CPC ......... *G08B 25/006* (2013.01); *G08B 25/004* (2013.01); *H04W 4/029* (2018.02); *H04W 24/08* (2013.01); *H04W 64/003* (2013.01)

(58) Field of Classification Search
USPC ....................................................... 340/506
See application file for complete search history.

(56) References Cited

U.S. PATENT DOCUMENTS

| 10,129,768 | B1* | 11/2018 | Azem ................. H04B 17/345 |
| 2004/0203607 | A1* | 10/2004 | Satapathy ............ H04M 1/724 |
| | | | 455/412.1 |
| 2016/0066182 | A1* | 3/2016 | Hodge ................ H04M 15/854 |
| | | | 455/411 |

* cited by examiner

*Primary Examiner* — Tai T Nguyen
(74) *Attorney, Agent, or Firm* — Fogarty LLP (57) ABSTRACT

Proactive multiple controlled-environment facility investigative data aggregation and analysis systems and methods may accept setup of alerts, each alert associated with particular data related to electronic communications, and each alert to be directed to at least one person not associated with the controlled-environment facility in which the communication originated, in which a particular resident associated with the electronic communication resides, and/or the like. Captured data related to electronic communications associated with each of a plurality of residents is received and/or retrieved and the at least one person not associated with the controlled-environment facility is alerted when the particular data related to electronic communications is received or retrieved with respect to a particular electronic communication.

23 Claims, 3 Drawing Sheets

PROACTIVE INVESTIGATION ALERT SYSTEMS AND METHODS FOR MULTIPLE CONTROLLED-ENVIRONMENT FACILITIES

TECHNICAL FIELD

The present disclosure relates generally to controlled-environment facilities, more particularly to investigations relating to controlled-environment facilities, and specifically to proactive investigation alerts across multiple controlled-environment facilities, such as correctional facilities.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

Controlled-environment facilities typically control and record information related to the various interactions, communications, and/or transactions involving the facilities' residents. For example, in a correctional facility (e.g., a prison or jail), such information may be collected and used for investigative purposes with respect to past, present, and future criminal activities. Accordingly, various exchanges of information, communication, money, goods, etc. may be recorded and stored in one or more electronic databases. Typically, each controlled-environment facility controls its own information database, which is generally not accessible by other facilities. Alerts related to controlled-environment facility resident (correctional facility inmate) communications are setup by a facility, typically the facility housing the resident and triggered alerts are only sent to that facility.

However, over the past several years, a sharp increase in the U.S. inmate population has not been followed by a proportional increase in the number of prison or jail staff. To the contrary, budget pressures in local, state, and federal governments have made it difficult for correctional facilities to maintain an adequate number of wardens, officers, and other administration personnel. Hence, many correctional facilities are often unable to perform investigations with respect to their own inmates.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide proactive multiple controlled-environment facility investigative data aggregation and analysis that may employ at least one controlled-environment facility communications management system, or the like and a centralized investigative data aggregation and analysis system, or the like. Each controlled-environment facility communications management system is associated with at least one controlled-environment facility and configured to capture data related to electronic communications associated with each of a plurality of residents of each controlled-environment facility. The centralized investigative data aggregation and analysis system, or the like, accepts setup of alerts, each alert associated with particular data related to electronic communications, and each alert to be directed to at least one person not associated with a particular controlled-environment facility. This person(s) not associated with a particular controlled-environment facility may not be associated with a particular controlled-environment facility in which the communication originated, in which a particular resident associated with the electronic communication resides, and/or the like.

The setup of (an) alert(s) may include associating the alert(s) with an individual controlled-environment facility resident and the particular data related to electronic communications associated with that individual resident. The particular data related to electronic communications used to setup and trigger (an) alert(s) may be a particular telephone number dialed or otherwise called, identification of a particular keyword, a particular controlled-environment facility resident trust account used to pay for the particular electronic communication, personal identification number of a particular resident used to place the electronic communication, the particular electronic communication being made to a mobile communication device located within a defined geographic area, the particular electronic communication being a resident-to-resident electronic communication, and/or the like.

The centralized investigative data aggregation and analysis system, or the like may receive and/or retrieve, from each controlled-environment facility communications management system, captured data related to electronic communications associated with each of a plurality of residents and alert the at least one person not associated with the controlled-environment facility in response to the particular data related to electronic communications being received in, or retrieved by, the centralized investigative data aggregation and analysis system with respect to the particular electronic communication. The issued alert may enable the at least one person not associated with the controlled-environment facility to monitor the particular electronic communication, without knowledge of any party to the particular electronic communication.

The centralized investigative data aggregation and analysis system, or the like may also alert at least one person that is associated with the controlled-environment facility in which the communication originated, the resident associated with the electronic communication resides, and/or the like, in response to the same or different particular data related to electronic communications being received in the centralized investigative data aggregation and analysis system. This alert may also enable the person(s) that is (are) associated with the controlled-environment facility to monitor the particular electronic communication, without knowledge of any party to the particular electronic communication.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Having thus described the invention in general terms, reference will now be made to the accompanying drawings, which are not necessarily drawn to scale, and wherein:

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

The present systems and methods relate generally to controlled-environment facilities, more particularly to investigations relating to controlled-environment facilities, and specifically to proactive investigation alerts operative across multiple controlled-environment facilities, such as multiple correctional facilities. Proactive multiple controlled-environment facility investigative data aggregation and analysis systems and methods may, in accordance with various embodiments, accept setup of alerts. Each alert may be associated with particular data related to electronic communications, and each alert may be set up to be directed to at least one person not associated with the controlled-environment facility in which the communication originated, in which a particular resident associated with the electronic communication resides, and/or the like. Captured data related to electronic communications associated with each of a plurality of residents is received and/or retrieved and the at least one person not associated with the controlled-environment facility is alerted when the particular data related to electronic communications is received or retrieved with respect to a particular electronic communication, in accordance with embodiments of the present systems and methods.

As used herein the term "covert alert," or the like, refers to automatically alerting, which may include forwarding a (live) electronic communication (telephone call, chat, email, text, video, voicemail, etc.) in which a controlled-environment facility resident (inmate) is taking part in to, an officer as it occurs. This provides preset forwarding of live inmate (resident) electronic communications to an investigator without the knowledge of the inmate/resident or the other call party. Typically, the investigator's line is muted so no one partaking in the communication knows someone is listening or watching.

Also, as used herein, a "multiple controlled-environment facility investigative data aggregation and analysis investigative tool" employed in conjunction with the present systems and methods is an investigative tool that aggregates and analyzes data from multiple sources, including, in accordance with some embodiments of the present invention, multiple controlled-environment facilities. This multiple controlled-environment facility investigative data aggregation and analysis investigative tool may take the form of a web-based portal enabling individuals to store and transmit information. Such a system may include forensic tools that analyze communications into and out of controlled-environment facilities to assist law enforcement. Such a multiple controlled-environment facility investigative data aggregation and a data analysis system, such as the THREADS™ system implemented by SECURUS® TECHNOLOGIES, INC., may provide law enforcement with actionable intelligence and focused leads using data collected from various resources, including, in accordance with embodiments of the present systems and methods. Additionally, or alternatively, in accordance with embodiments of the present systems and methods, each individual controlled-environment facility may implement a controlled-environment facility investigative data aggregation and analysis investigative system, which may be integrated into one or more of a controlled-environment facility communications processing system, a controlled-environment facility administration and management system, and/or the like.

Figure 1:
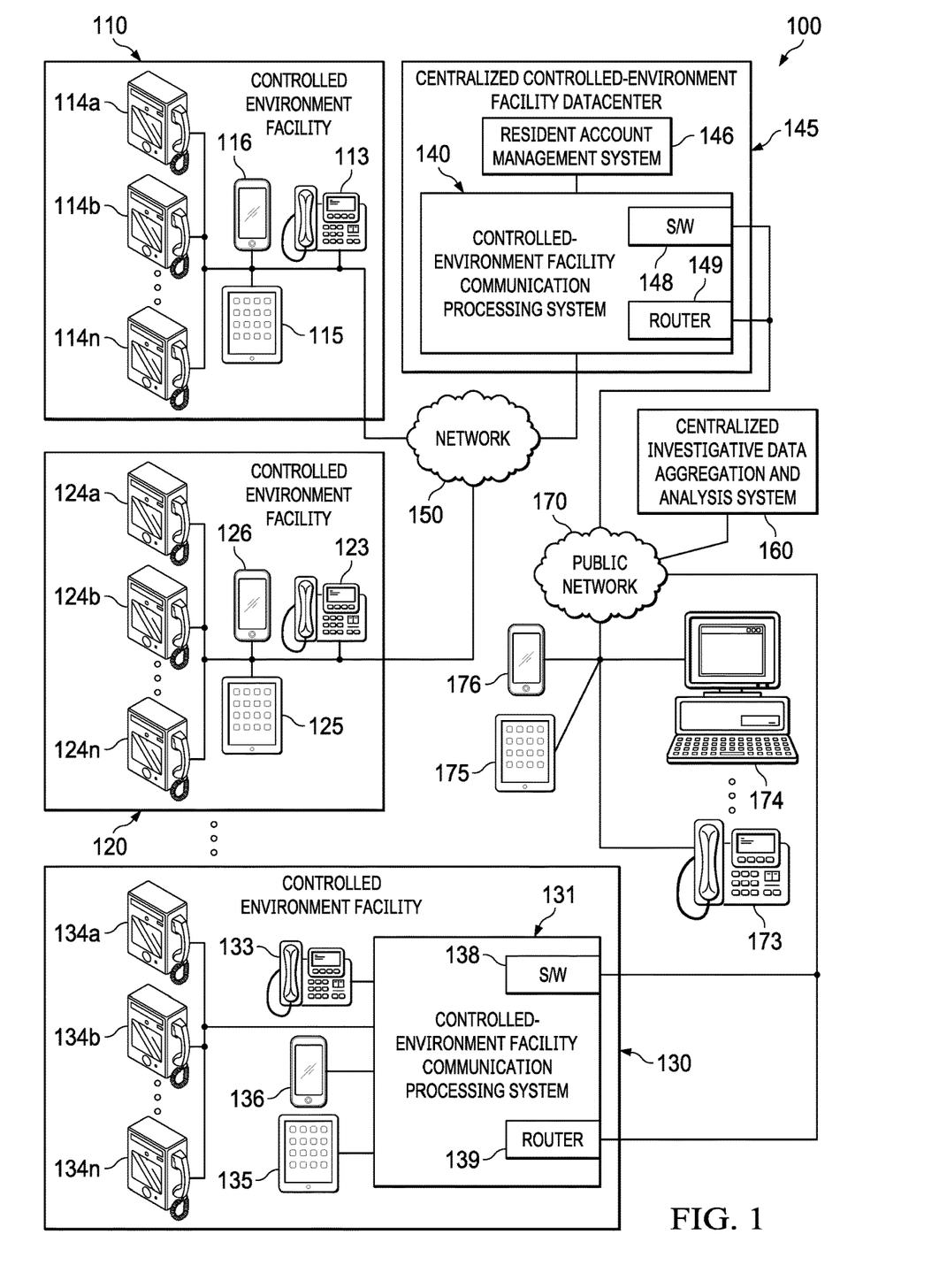
FIG. 1 is a diagrammatic illustration of an example communications environment, wherein an example embodiment of the present systems and methods for proactive controlled-environment facility investigation alerts may be deployed with respect to multiple controlled-environment facilities, according to some embodiments.

FIG. 1 is a diagrammatic illustration of an example communications environment 100, wherein an example embodiment of the present systems and methods for proactive controlled-environment facility investigation alerts may be deployed, according to some embodiments, with respect to one or more controlled environment facilities 110, 120, 130 etc. Therein, external, centralized communication processing system 140, onsite communication processing system 131, or the like may provide telephone services, videoconferencing, online chat, and other communication services to residents of respective controlled-environment facility 110, 120, 130, etc. As illustrated, in some cases, a communication processing system (131) may be co-located with a controlled-environment facility (130). Alternatively, as also illustrated a communication processing system (140) may be centrally or remotely located, in whole or in part, with respect to one or more controlled-environment facilities (110, 120, etc.), such as in a controlled-environment facility vendor datacenter (145), and may be connected to such facilities via a public or private network (150) (e.g., via a secure tunneling protocol over the internet, using encapsulation, an intranet, or other type of data network), and may provide communication services to such multiple controlled-environment facilities. More generally, however, it should be noted that communication systems 131, 140, etc. may assume a variety of forms, including telephony switches such as electronic switching systems, or the like, and/or and may be configured to serve a variety of facilities and/or users, whether within or outside of a controlled-environment facility In addition to providing certain visitation and communication operations, communication processing systems 131 and 140 may attempt to ensure that an inmate's electronic communications, such as calls, video conferences, online chats, etc. are performed only with non-residents whose identities, devices, email addresses, phone numbers, etc. are listed in that inmate's Personal Allowed Number (PAN) or Pre-Approved Contact (PAC) list. Each inmate's PAN or PAC list may be stored, for example, in a database maintained by controlled-environment facility vendor datacenter 145, centralized investigative data aggregation and analysis system 160, and/or the like. In addition to PAC and/or PAN list(s), controlled-environment facility vendor datacenter 145, centralized investigative data aggregation and analysis system 160, and/or the like, may also store Resident Profile Data (RPD), as well as communication and/or visitation rules applicable to each resident, Communication Detail Records (CDRs), or similar records, for resident electronic communications, such as phone calls, video visitations, texts, online chats, or the like. This controlled-environment facility vendor datacenter 145 and/or centralized investigative data aggregation and analysis system 160 database(s) may include information such as balances for resident trust and calling accounts; trial schedule; conviction data; criminal record; sentencing data, such as time served, time remaining to be served, and release date; cell and cellmate assignments; resident restrictions and warnings; commissary order history; telephone call history; call recordings; known or suspected gang or criminal affiliations; known or suspected affiliates, accomplices, or gang members; and any other information that may be relevant or useful to correctional facility staff to house and maintain residents. Controlled-environment facility resident account management system 146, which may be a separate system, or which may be a part or function of controlled-environment facility vendor datacenter 145, as illustrated, may maintain resident accounts to the benefit of the respective resident, such as resident commissary accounts, resident communications accounts, which may be used to pay for purchase of a controlled-environment facility resident communication and/or media devices (115, 116, 125, 126, 135, 136, etc.), communications, such as phone calls, video visitation, internet chats, emails, text messages, or the like.

Thereby, in some embodiments, the lives of inmates/residents may be electronically managed from booking through release, through facility management (including tracking inmates from booking through release), staff management (including time and attendance management and personnel dispatching), call management (including placing and blocking electronic communications, accounting for call charges, distance commerce, determining credit worthiness of individuals, establishing and maintaining accounts, and handling purchases of goods and services), and inmate management (including managing inmate information and tracking inmate activity). Other management systems may include public phone companies, cell phone forensics, internet service providers, visitation systems including video and non-video systems, postal services, email services, payment processors and the like.

Residents may use more-or-less conventional telephones 113, 123, 133, or the like to access certain communication services, under control of respective communication processing system 131, 140, etc. Additionally, or alternatively, in some facilities a resident may use a video visitation device 114a through 114n, 124a through 124n, 134a through 134n, or the like, to place voice calls, as well as for video visitation, under control of respective communication processing system 131, 140, etc. Such a video visitation device may be referred to as an Intelligent Facility Device (IFD) (114, 124,134), which may be a video phone particularly adapted for use in a controlled-environment facility, but which may be used to place voice calls, as well. Alternatively, or additionally, IFDs may take the form of, or be used as, a voice phone that may have a touchscreen interface. Generally speaking, IFDs may be disposed in a visitation room, in a pod, as part of a kiosk, etc. Additionally, or alternatively, in some facilities, residents may also use a personal computer wireless device, such as a tablet computing device 115, 125, 135, smartphone/media player 116, 126, 136, or the like, which may have been adapted and/or approved for use in a controlled-environment facility. Such a tablet computing device or smartphone/media player may be referred to as an Intelligent Resident Device (IRD), or the like, and in a correctional institution embodiment, as an Intelligent Inmate Device (IID), or the like. As will be appreciated, IIDs, IFDs, or other similar devices, as well as phones 113, 123, 133, etc. have communications capabilities, to enable a party to participate in electronic communications, such as telephone calls, video visitation sessions (video calls), or the like, with other call parties, such as non-residents, under control of respective communication processing system 131, 140, etc.

In some embodiments, IFDs 114, 124, 134, etc. may be implemented as a computer-based system. For example, each of IFD may include a display, camera, and handset. The display may be any suitable electronic display such as, for example, a Liquid Crystal Display (LCD), a touchscreen display (e.g., resistive, capacitive, etc.), or the like, whereas the camera may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone). During a video visitation session, IFDs may be configured to capture a video image of a resident to be transmitted to a non-resident using the camera, and to display a video image of the non-resident to the resident using the display. IFDs may also be configured to capture an audio signal from the resident to be transmitted to a non-resident using the mouthpiece portion of the handset, during video visitation call or during a voice call. Complementarily, the IFD may provide an audio signal from the non-resident to the resident using the earpiece portion of the handset, during such calls. Additionally, or alternatively, audio received from the non-resident may be reproduced via a loudspeaker, and audio provided by the resident may be captured via a microphone.

IFDs may be a replacement for typical telephones provided in controlled-environment facilities, such as rehabilitation centers, jails and prisons, utilizing existing facility telephony wiring. While the IFDs are illustrated in FIG. 1 as hardened, wall-mounted devices, IFDs may also take the form of a kiosk-type terminal or the like. In some cases, IFDs may assume the form of any computer, tablet computer, smart phone, etc., or any other consumer device or appliance with audio and/or video conferencing capabilities. For example, in a correctional facility environment a tablet computing device may be mounted on a wall, in a hardened case as an IFD. IFDs may replace a typical pay phone found in some facilities and may provide touch screen computer functionality that enables a resident to perform "self-service" tasks such as setting up doctor appointments, scheduling visitation, viewing schedules, and checking the status of his or her case. The intelligent facility device may include an RFID or biometric reader, or the like to enable precise identification of each resident. In addition, the intelligent facility device includes, as noted, a built-in camera and telephone handset to enable a resident to use video conferencing to meet face to face with attorneys, family and friends. In accordance with embodiments of the present systems and methods, IFDs 114, 124, 134, etc. may be employed to facilitate implementation of embodiments of the present systems and methods, and/or to carry out all or certain aspects of embodiments of the present systems and methods.

As noted, IIDs 115, 125, 135, etc. may be tablet computing devices or smartphones/media players 116, 126, 136, etc. adapted and/or approved for use by residents of the respective controlled-environment facility (within the controlled-environment facility) 110, 120, 130, etc. Each IRD may be particularly adapted for use in a controlled-environment. For example, in a correctional institution, jail, or the like, such an BD may be "stripped-down," particularly from the standpoint of what applications programs (apps) are provided or allowed on the IID, and/or connectivity afforded to the IID. By way of example, such an IRD may employ an operating system kernel that has been rebuilt for use in such a tablet computing device in a controlled-environment facility. For example, such an IRD may be adapted to only connect to a network provided by the controlled-environment facility, and/or in only certain locations, within the controlled-environment facility, such as may be controlled by availability of Wi-Fi access, or the like, only being available in certain areas, as discussed above. That is, for example, where access may be compartmentalized, leveraging the structure of the controlled-environment facility for example limiting the availability of a Wi-Fi signal providing the stream through the placement of wireless access points, antenna directionality of such wireless access points, and/or the like. Also, the IRD may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on an IRD might include apps of particular interest to residents of the controlled-environment facility. For example, an IID provided to inmates of correctional facilities, might include apps that may be of particular use to an inmate, in general, such as access to a legal research service, or of more specific interest, such as providing an inmate nearing release, access to employment searching apps or the like. Hence, such IIDs may be used to help soon to be released inmate's transition. For example, the BD may be used to communicate with a future employer, or the like. As such, IIDs may be sponsored, or otherwise subsidized by organizations or companies, assisting with the transition of inmates into society. As noted, in accordance with embodiments of the present systems and methods, IIDs may be used to communicate with others, such as through phone calls, video calls, or the like. To this end such IIDs (115, 125, 135, 116, 126, 136, etc.) may include a preinstalled, non-removable app to facilitate implementation of embodiments of the present systems and methods, and/or to carry out all or certain aspects of embodiments of the present systems and methods.

To access communications services, a resident may initiate telephone services by lifting the receiver on telephone 113, 123,133, etc. or IFD 114, 124, 134, etc. and/or otherwise initiating an electronic communication, such as by launching an applications program (app) on IRD 115, 125, 135, 116, 126, 136, etc. At which time, the resident may be prompted to provide a personal identification number (PIN), other identifying information or biometrics. An interactive voice response (IVR) unit (not shown, but which may be integrated into communications processing system 131 and/or 140, etc.) may generate and play a prompt or other messages to the resident. Under the control of communication processing system 131 and/or 140, etc. the device may be capable of connecting to a non-resident's device (e.g. telephone 173, non-resident computer 174, non-resident tablet computing device 175, non-resident smartphone/media player 176, or the like) across public network 170, such as a publicly switched telephone network (PSTN), an Integrated Services Digital Network (ISDN), Voice-over-IP (VoIP) or packet data network, such as for example the Internet, etc. Network 170 may be the same, or a different network, as network 150. Telephony switch 148, 138, etc. in respective communication processing system 131, 140, etc. may be used to connect calls across a PSTN, such as calls from controlled-environment facility telephone 113, 123 or 133 and non-resident telephone 173. Telephony router 149, 139, etc., media gateway functionality, or the like of respective communication system 131, 140, etc. may be used to route data packets associated with a digital call connection, via an Integrated Services Digital Network (ISDN), the Internet, or the like (i.e., network 170). For example, a non-resident party may have a personal or laptop computer 174 with a webcam, or the like, or devices 175 or 176 may have an integrated camera and display (e.g., a smart phone, tablet, etc.). A network connection between the parties may be established and supported by an organization or commercial service that provides computer services and software for use in telecommunications and/or VOIP, such as SKYPE®. Additionally, or alternatively, the correctional facility and/or the destination may use videoconferencing equipment compatible with ITU H.323, H.320, H.264, and/or V.80, or other suitable standards. In accordance with various embodiments of the present systems and methods, non-resident's devices, telephone 173, non-resident computer 174, non-resident tablet computing device 175, non-resident smartphone/media player 176, and/or the like, may be disposed in the non-resident's home, place of work, on their person, or the like. Additionally, or alternatively the non-resident devices may be disposed in a visitation area of controlled-environment facility 110, 120, 130, etc., which may be within, adjacent to, or remote with respect controlled-environment facility 110, 120, 130, etc., itself.

In some implementations, communication processing system systems 140 and/or 131, may be configured to perform communication monitoring operations, such being configured to monitor and or record communication sessions (e.g., as electronic video files). In accordance with various embodiments of the present systems and methods, a controlled-environment communication apparatus that may carry out capture of dialed non-resident phone numbers, or the like, may take the form of central and/or onsite controlled-environment facility communication management system 140 and/or 131, respectively. That is, the present multiple controlled-environment facility investigative data aggregation and analysis system may employ the controlled-environment facility communications management systems (131 and 140) associated with at least one controlled-environment facility (110, 120 or 130) for capturing telephone number of non-residents dialed by each resident of the associated controlled-environment facility.

This telephone number may be called by the resident or the non-resident might otherwise use the telephone number to communication with the resident, such as via the respective controlled-environment facility communications management system 131 or 140 associated with the controlled-environment facility in which the resident resides 110, 120 or 130. For example, the controlled-environment facility communications management system 131 or 140 may capture the called telephone number of the non-resident associated with the resident when the resident calls the non-resident's telephone number. In another example, wherein the captured telephone number is a telephone number used by a non-resident to communicate with the resident, the number may be captured by controlled-environment facility communications management system 131 or 140 when the non-resident calls into a video visitation or other scheduled call, or in similar circumstances. In yet another example the resident or non-resident number may be captured as a result of an illicit electronic communication, such as an electronic communication from or to a contraband cell phone in the possession of an inmate/resident, to or from the non-resident.

Embodiments of the present systems and methods may employ a secure, web-based portal enabling individuals to store and transmit information, including forensic tools that analyze communications into and out of controlled-environment facilities, that assists law enforcement. Such a portal may be provided by centralized investigative data aggregation and analysis system 160, which may provide such investigative tools. Such investigative tools may provide collection, processing, analysis, and/or reporting of information for intelligence purposes. In some embodiments, the investigative tools may provide functions such as entity linkage analysis, communication statistics, organization analysis, communication behavior analysis, subscription usage analysis, common communication analysis, timelines, correlations, mapping, word search, language translation (whether machine translation or access to translation services), call recording (whether terminated external to the controlled-environment facility or internally thereto), electronic communication notification, electronic communication monitoring (whether real-time or recorded, and whether monitoring a particular electronic communication or a plurality of electronic communications), call "barging," electronic communication control, visitation monitoring/background checking, crime tip conduit, account activity monitoring (whether tracing deposits and expenditures of monies or monitoring account trends and behavior, such as velocity of transactions), multiple database querying, and resource integration, and/or the like. One or more of these investigative tools may be provided through an intuitive user interface to provide ease of use, facilitate operation across a variety of user terminals, and/or to facilitate remote access to one or more features thereof. For example, in some cases, a web page (e.g. the aforementioned "portal") having menus comprising an investigator dashboard may be provided, to present and facilitate execution of various investigative operations. These investigative tools may log calls (e.g., as CDRs), so that an investigator may research them through an archive and may be provided access to internal and/or external criminal databases and/or other sources of useful information.

Centralized investigative data aggregation and analysis system 160 is, in accordance with embodiments of the present systems and methods, configured to accept setup of alerts. Each such alert may be associated with particular data related to electronic communication, such as a particular controlled-environment facility resident dialed telephone number or other data related to electronic communications that may be associated with an individual controlled-environment facility resident associated with, or otherwise named, in the alert. In various embodiments, an alert can be activated based on a number of different of conditions. One such condition can be a series of dialed numbers, a specific time frame in which these numbers are dialed, a combination of communications to specific contacts, or the like. Word spotting can additionally, or alternatively identify keywords in a communication, which may activate an alert in accordance with embodiments of the present systems and methods.

Also, in accordance with embodiments of the present systems and methods, each alert is defined to be directed to at least one person not associated with a controlled-environment facility in which the communication originated and/or in which a subject individual resident resides. This/these person(s) may be associated with one or more other controlled-environment facilities (correctional facilities) than where a subject communication originated and/or in which a subject resident (inmate) resides, law enforcement, or the like. Therefore, to setup such alerts, it may be necessary, or at least desirable, to (first) setup permissions for sharing of information between controlled-environment facilities (correctional facilities). For example, with respect to correctional facilities, or the like jurisdictions may, in a "community" process, share information by state, county, region, etc. In accordance with such embodiments, a facility may setup an alert in accordance with the present systems and methods and list of alerts may be provided to the community of facilities. Each facility may then choose alerts from the list that they wish to receive. Once the facility selects an alert, it may request permission from the issuing facility and resulting alerts and data is shared if both facilities agree. Additionally, or alternatively, when a controlled-environment facility communications system is setup, such as by a controlled-environment facility communications vendor, an option may be provided to the facility to opt-in to such a community and share alerts and resulting data, for example to connect with neighboring counties, share with all counties in the state, etc.

Centralized investigative data aggregation and analysis system 160 is also, in accordance with embodiments of the present systems and methods, configured to receive captured data related to controlled-environment facility resident electronic communications such as, resident and non-resident telephone numbers, and the like, such as, from each controlled-environment facility communications management system 131 or 140, or the like. Whereupon, the centralized investigative data aggregation and analysis system 160 alerts the person(s) not associated with the controlled-environment facility in which the communication originated and/or in which a subject individual resident resides that setup the alert, with respect to a particular electronic communication, in response to the setup particular data related to electronic communications being received in the centralized investigative data aggregation and analysis system.

In accordance with embodiments of various centralized investigative data aggregation and analysis system investigative tools, the fact that an electronic communication was placed by a particular inmate to a particular known associate may indicate that a criminal act is likely being contemplated, thereby providing a predictive model for investigative reporting, which can result in issuance of a covert alert in accordance with embodiments of the present systems and methods. As noted, such a "covert" alert may automatically alert, such as by forwarding a (live) electronic communication (telephone call, chat, email, text, video, voicemail, etc.) in which a controlled-environment facility resident (inmate) is taking part in, to an officer, as it occurs. This provides preset forwarding of live inmate (resident) electronic communications to an investigator without the knowledge of the inmate/resident or the other call party. Typically, the investigator's line is muted so no one partaking in the communication knows someone is listening and/or watching. Gathered information may be incorporated into centralized investigative data aggregation and analysis system 160 so as to provide investigative leads to users of the multiple controlled-environment facility investigative data aggregation and analysis system, such as via a web-based interface provided by the centralized investigative data aggregation and analysis system for use in response to such a covert alert.

Thus, not only may centralized investigative data aggregation and analysis system 160 facilitate setup of alerts and establishing permissions for sharing of information between controlled-environment facilities (correctional facilities), the centralized investigative data aggregation and analysis system may also facilitate overall issuance of, distribution of, and follow-up to, proactive investigation alerts across multiple controlled-environment facilities in accordance with embodiments of the present systems and methods.

Figure 2:
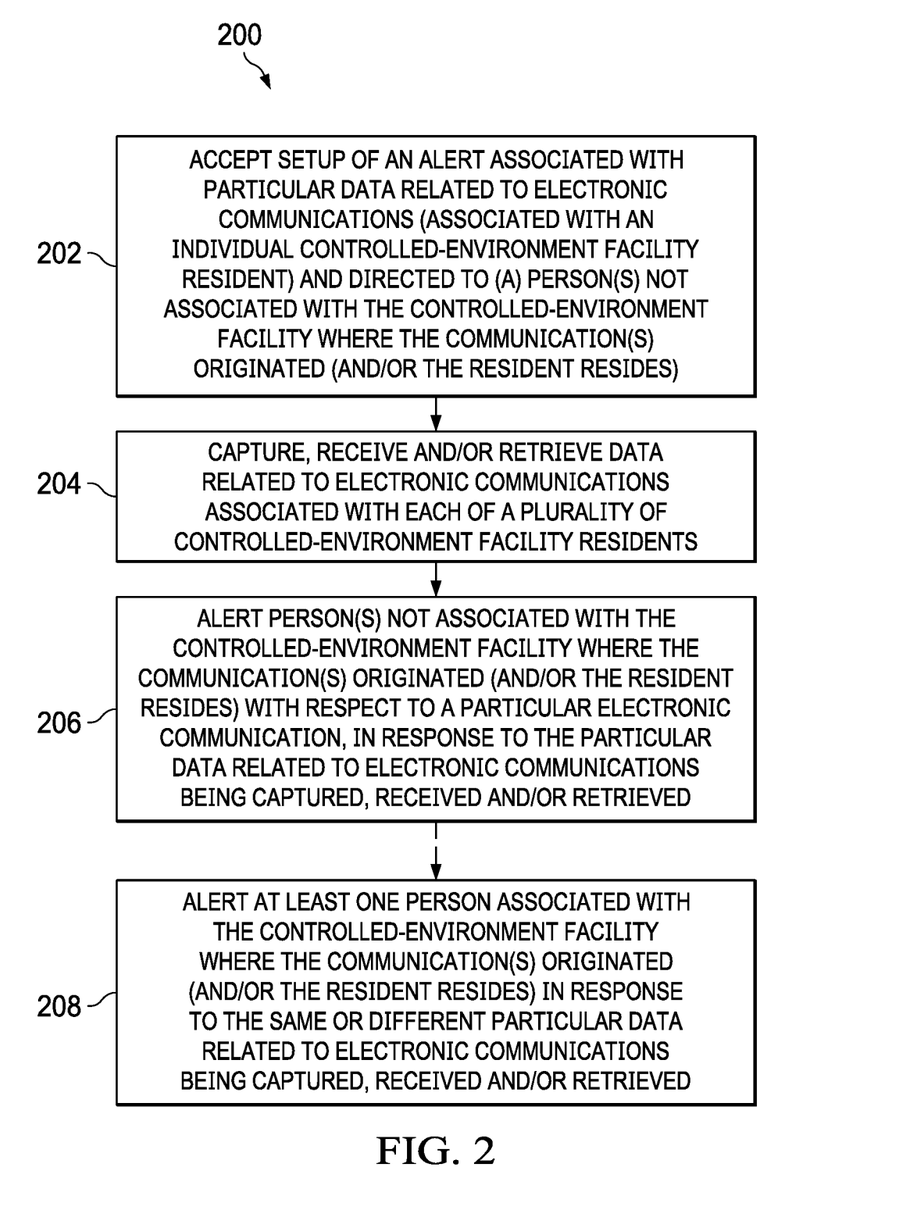
FIG. 2 is a flowchart of an example proactive controlled-environment facility investigation alert process, in accordance with some embodiments.

FIG. 2 is a flowchart of example proactive correctional environment investigation (covert) alert process 200. Therein in accordance with some embodiments of the present systems and methods, at 202 a centralized investigative data aggregation and analysis system (160), a central controlled-environment facility communications management system (131 and/or 140) or the like, may accept setup of (covert) alerts. Each (covert) alert may be associated with particular data related to electronic communication, such as data related to electronic communications that may be associated with an individual controlled-environment facility resident associated with, or otherwise named in the alert. This particular data related to electronic communications may be a particular telephone number dialed/called by an individual resident, a particular telephone/communications device within the controlled-environment facility used for the electronic communication, a particular controlled-environment facility resident trust account used to pay for the particular electronic communication, a PIN used to place the electronic communication, the electronic communication being made to a mobile communication device located within a defined geographic area, the electronic communication being a resident-to-resident electronic communication, particular keywords spoken or appearing in the electronic communication, and/or the like. Further, each (covert) alert may be, in accordance with embodiments of the present systems and methods, defined to be directed to at least one person not associated with a controlled-environment facility in which the communication originated and/or the subject individual resident resides. As noted, this/these person(s) may be associated with one or more other controlled-environment facilities (correctional facilities) than where a subject communication originated and/or in which a subject resident (inmate) resides, law enforcement, or the like. Therefore, as noted, it may be necessary, or at least desirable, to (first) setup permissions for sharing of information between controlled-environment facilities (correctional facilities) to facilitate setup of such alerts as discussed above.

A controlled-environment facility communications management system associated with at least one controlled-environment facility, the centralized investigative data aggregation and analysis system, or the like, may, at 204, capture, retrieve, or otherwise receive data related to electronic communications associated with each of a plurality of residents of each controlled-environment facility. As noted above, this particular data related to electronic communications may be a particular telephone number dialed/called by a resident, a particular telephone/communications device within the controlled-environment facility used for the electronic communication, a particular controlled-environment facility resident trust account used to pay for the particular electronic communication, a PIN used to place the electronic communication, the electronic communication being made to a mobile communication device located within a defined geographic area, the electronic communication being a resident-to-resident electronic communication, keywords spoken or appearing in the electronic communication, and/or the like.

In response to the particular data related to electronic communications being received in the centralized investigative data aggregation and analysis system, respective controlled-environment facility communications management system, or the like, a(n) (covert) alert may be issued at 206, to the person(s) not associated with the controlled-environment facility in which the communication originated and/or s subject resident resides. This "investigator" may be notified by the investigator's phone ringing, or otherwise notified, such as through a text message, an email or in a report that may be generated on demand or on a scheduled basis. This (covert) alert may enable the alerted party to monitor the particular electronic communication, without the knowledge of the particular resident and any other party to the particular electronic communication. Consistent with the above alert setting from 202, this triggering data related to electronic communications may be a particular telephone number dialed/called by an individual resident, a particular telephone/communications device within the controlled-environment facility used for the electronic communication, a particular controlled-environment facility resident trust account used to pay for the particular electronic communication, a PIN used to place the electronic communication, the electronic communication being made to a mobile communication device located within a defined geographic area, the electronic communication being a resident-to-resident electronic communication, keywords spoken or appearing in the electronic communication, and/or the like.

Also, in accordance with various embodiments of the present systems and methods, the controlled-environment facility communications management system associated with at least one controlled-environment facility, the centralized investigative data aggregation and analysis system, or the like, may also, at 208, (covert) alert at least one person associated with the controlled-environment facility in which the communication originated and/or in which a subject individual resident resides in response to the same or different particular data related to electronic communications being received in the controlled-environment facility communications management system associated with at least one controlled-environment facility, the centralized investigative data aggregation and analysis system, or the like. This (covert) alert also enables the alerted party associated with the controlled-environment facility in which the communication originated and/or in which a subject individual resident resides to (also) monitor the particular electronic communication, without the knowledge of the particular resident and any other party to the particular electronic communication.

Consistent with the forgoing, a covert alert may automatically forward a live or previously recorded electronic communication to an officer, or other controlled-environment facility associated personnel, as it occurs. This provides forwarding of live or previously recorded inmate/resident electronic communications to an investigator without the knowledge of the inmate/resident or the other communication party. The investigator's line is, in accordance with embodiments of the present systems and methods, muted so no one on the call knows someone is listening to or viewing them.

For a dialed-number, or the like, the alert is issued to the third person ("alertee") whenever a specific dialed number connects. For example, an investigator, or the like might use a covert alert if they pulled a frequently called number report (via the centralized investigative data aggregation and analysis system (160), a controlled-environment facility communications management system (131 and/or 140) associated with at least one controlled-environment facility, or the like) and did not recognize a high usage number, or the like, if the number does not belong to a controlled-environment facility service provider, attorney, a public defender's office, or the like, the investigator may setup a covert alert on the phone number. Thereby, in accordance with the foregoing, every time an inmate/resident calls that number the officer will be notified, such as by the officer's phone ringing or otherwise notifying the officer, so he or she can listen to, or otherwise monitor the electronic communication.

For a specific controlled-environment facility phone, the alert is issued at 206 (and 208) to the third person when an electronic communication is completed, or at least placed, from a specific phone in the facility. That is, any electronic communication from that phone will be forwarded to the designated person. For example, before serving a search warrant, a covert alert may be setup (at 202) on a specific phone in an intake area of the controlled-environment facility. In such an example, while investigators search, the suspect may be booked into the facility and given a phone call from the designated phone. The investigator is notified, such as by the investigator's phone ringing or otherwise notifying the investigator, and the investigator may hear the suspect tell an accomplice information that may lead to evidence. Also, in accordance with embodiments of the present systems and methods if the accomplice is not at the premises being searched, a covert alert report may provide the accomplice's telephone number, and a reverse phone number lookup on the dialed number may identify the accomplice.

For a custody account covert alert, the third person is alerted any time an electronic communication is initiated by a specific inmate. This alert type is, by way of example, available with respect to controlled-environment facilities that use PINs. For example, if an investigator suspects an inmate/resident is involved in smuggling contraband into the facility, then they may create a (covert) alert (at 202) on the inmate/resident, and whenever the inmate/resident initiated and electronic communication, the investigator may then be notified, such as by the investigators' phone ringing or otherwise notifying the investigator, allowing him or her to listen to the inmate's/resident's conversations as they occur.

For a "geo-fence" (i.e., mapped geographic area, alerts to an investigator may issue (at 206 (and 208) when an inmate completes, or at least initiates, a call to a cell phone that is located within a geographic area defined by the investigator. With respect to keywords, a (covert alert) may be created at 202 that includes keywords as particular data related to electronic communications (associated with an individual resident, or the like). Spoken keywords recognized by a centralized investigative data aggregation and analysis system (160), a central controlled-environment facility communications management system (131 and/or 140), or the like, such as through use of speech recognition, or (and) keywords typed in a text, or the like, during an electronic communication captured at 204 may result in an alert at 206 (and 208).

In accordance with embodiments of the present systems and methods alert may be issued (at 206) to the multiple persons not associated with the controlled-environment facility from which the communication originated and/or in which a subject resident resides, while alerts may in some instances, be issued (at 208) to multiple persons associated with the controlled-environment facility in which the communication originated and/or in which a subject resident resides. That is multiple persons can be alerted in each place, per phone, per dialed number, per inmate, per geo-fence, and/or per keyword, etc., allowing multiple alerts for a single investigation.

Various elements of the present proactive investigation (covert) alerts for multiple controlled-environment facilities may be implemented as modules. Modules may be implemented in hardware. In another embodiment, modules may be expressed in software executed by hardware. In still another embodiment, modules may be implemented in firmware operated by hardware. In still other embodiments, modules may be implemented in combinations of hardware, software, and/or firmware.

Figure 3:
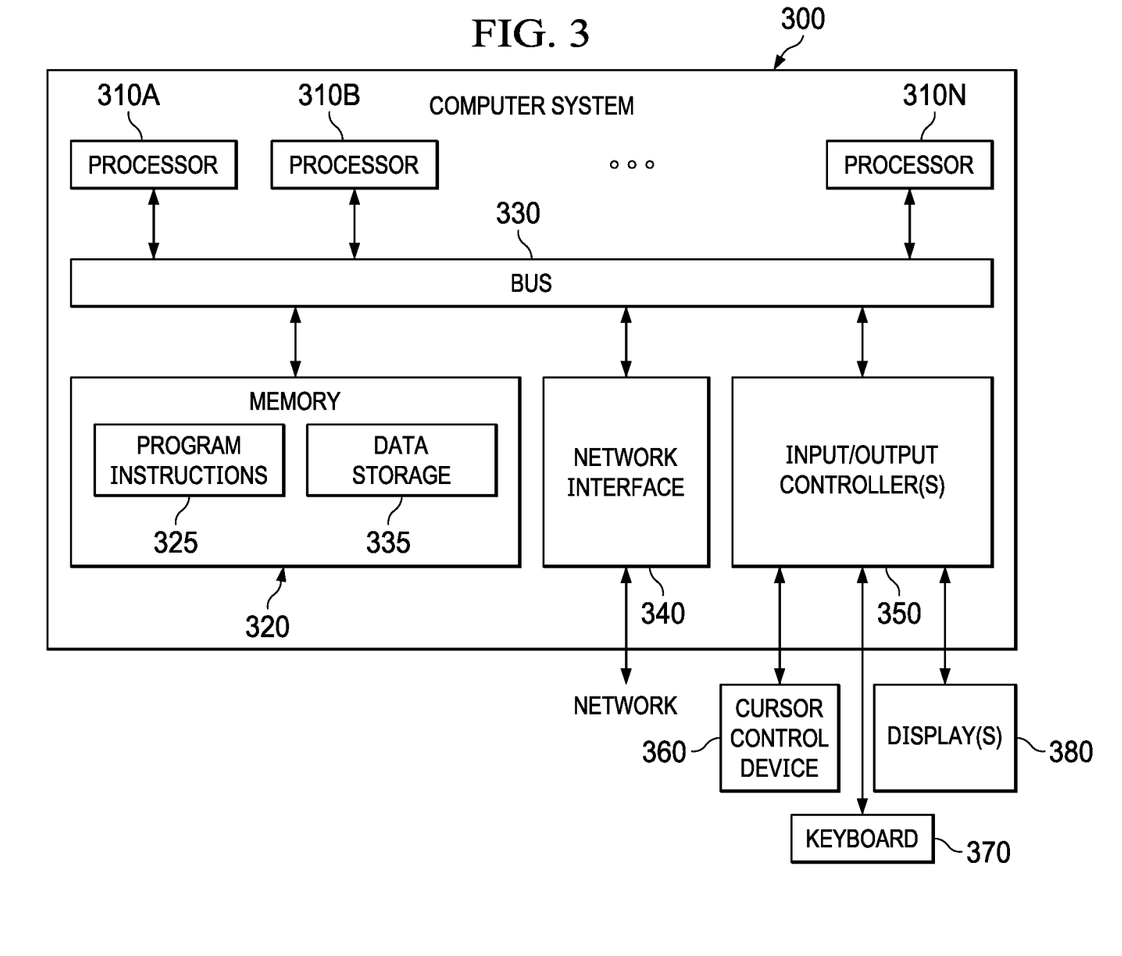
FIG. 3 is a block diagram of a computer system, device, station, or terminal configured to implement various techniques disclosed herein, according to some embodiments.

Embodiments of the present systems and methods for proactive investigation (covert) alerts for multiple controlled-environment facilities, as described herein, may be implemented or executed, at least in part, by one or more computer systems. One such computer system is illustrated in FIG. 3. In various embodiments, computer system 300 may be a server, a mainframe computer system, a workstation, a network computer, a desktop computer, a laptop, a tablet computing device, media player, or the like. For example, in some cases, computer 300 may implement one or more steps of example process 200 described above with respect to FIGS. 1 and 2, and/or a computer system such as computer system 300 may be used as part of, one or more of: controlled environment facility communications management systems 131 and/or 140; centralized investigative data aggregation and analysis system 160; controlled-environment facility resident communications devices 113 through 116, 123 through 126, and 133 through 136; non-resident communications devices 173 through 176; and/or the like. In various embodiments two or more of these computer systems may be configured to communicate with each other in any suitable way, such as, for example, via a network. For example, in FIG. 1, centralized investigative data aggregation and analysis system 160 is illustrated as communicating with controlled-environment facility communications management systems 131 and 140, via public network 170, which may be the Internet. Further, users of the present investigative data aggregation and analysis system may communicate therewith via public network 170 (e.g. the Internet) or the like.

As illustrated, computer system 300 includes one or more processors 310A-N coupled to a system memory 320 via bus 330. Computer system 300 further includes a network interface 340 coupled to bus 330, and one or more I/O controllers 350, which in turn are coupled to peripheral devices such as cursor control device 360, keyboard 370, display(s) 380, etc. Each of I/O devices 360, 370, 380 may be capable of communicating with I/O controllers 350, for example, via a wired connection (e.g., serial port, Universal Serial Bus port) or wireless connection (e.g., Wi-Fi, Bluetooth, Near Field Communications Link, etc.). Other devices may include, for example, microphones, antennas/wireless transducers, phone detection modules, etc.

In various embodiments, computer system 300 may be a single-processor system including one processor 310A, or a multi-processor system including two or more processors 310A-N (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or another dedicated graphics-rendering device.

System memory 320 may be configured to store program instructions and/or data accessible by processor 310. In various embodiments, system memory 320 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 320 as program instructions 325 and data storage 335, respectively. In other embodiments, program instructions and/or data may be received, sent, or stored upon different types of computer-accessible media or on similar media separate from system memory 320 or computer system 300.

A computer-accessible medium may include any tangible and/or non-transitory storage media or memory media such as electronic, magnetic, or optical media—e.g., disk or CD/DVD-ROM coupled to computer system 300 via bus 330. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 330 may be configured to coordinate I/O traffic between processor 310, system memory 320, and any peripheral devices in the computer system, including network interface 340 or other peripheral interfaces, such as I/O devices 360, 370, 380. In some embodiments, bus 330 may perform any necessary protocol, timing, or other data transformations to convert data signals from one component (e.g., system memory 320) into a format suitable for use by another component (e.g., processor 310). In some embodiments, bus 330 may include support for devices attached through various types of peripheral buses, such as a variant of the Peripheral Component Interconnect (PCI) bus standard or the Universal Serial Bus (USB) standard, for example. In some embodiments, the function of bus 330 may be split into two or more separate components, such as a northbridge chipset and a southbridge chipset, for example. In addition, in some embodiments some or all the functionality of bus 330, such as an interface to system memory 320, may be incorporated directly into processor(s) 310A-N.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 350 may, in some embodiments, enable communications with one or more display terminals, keyboards, keypads, touchpads, scanning devices, voice or optical recognition devices, mobile devices, or any other devices suitable for entering or retrieving data by one or more computer system 300. Multiple I/O controllers 350 may be present in computer system 300 or may be distributed on various nodes of computer system 300. In some embodiments, I/O devices may be separate from computer system 300 and may interact with one or more nodes of computer system 300 through a wired or wireless connection, such as over network interface 340.

As shown in FIG. 3, system memory 320 may include program instructions 325, configured to implement certain embodiments described herein, and data storage 335, comprising various data may be accessible by program instructions 325. In an embodiment, program instructions 325 may include software elements, which may be configured to affect the operations discussed in FIGS. 1 AND 2. Program instructions 325 may be implemented in various embodiments using any desired programming language, scripting language, or combination of programming languages and/or scripting languages (e.g., C, C++, C#, JAVA®, JAVASCRIPT®, PERL®, etc.). Data storage 335 may include data that may be used in these embodiments (e.g., recorded communications, profiles for different modes of operations, etc.). In other embodiments, other or different software elements and data may be included.

A person of ordinary skill in the art will appreciate that computer system 300 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various operations described herein, particularly in connection with FIGS. 1 and 2, may be implemented in software executed by processing circuitry, hardware, or a combination thereof. Programming may take the form of stored program instructions, programed firmware, or the like, while hardware might take the form of an Application Specific Integrated Circuit (ASIC), or the like, to carry out such aspects of embodiments of the present systems and methods. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A proactive multiple controlled-environment facility investigative data aggregation and analysis system comprising:
   at least one controlled-environment facility communications management system, each controlled-environment facility communications management system associated with at least one controlled-environment facility and configured to capture data related to electronic communications associated with each of a plurality of residents of each controlled-environment facility; and
   a centralized investigative data aggregation and analysis system configured to:
      accept setup of alerts, each alert associated with particular data related to electronic communications, and each alert to be directed to at least one person not associated with a controlled-environment facility in which a subject communication originated;
      receive and/or retrieve, from each controlled-environment facility communications management system, captured data related to electronic communications associated with each of a plurality of residents; and
      alert the at least one person not associated with the controlled-environment facility in which the subject communication originated in response to the particular data related to electronic communications being received in, and/or retrieved by, the centralized investigative data aggregation and analysis system with respect to a particular electronic communication.

2. The system of claim 1, wherein setup of alerts further comprises each alert being associated with an individual controlled-environment facility resident and the particular data being related to electronic communications associated with the individual resident.

3. The system of claim 1, wherein each alert is directed to at least one person not associated with a controlled-environment facility in which the individual resident resides.

4. The system of claim 1, wherein the alert enables the at least one person not associated with the controlled-environment facility in which the subject communication originated to monitor the particular electronic communication, without knowledge of any party to the particular electronic communication.

5. The system of claim 1, wherein the centralized investigative data aggregation and analysis system is further configured to also alert at least one person associated with the controlled-environment facility in which the subject communication originated in response to same or different particular data related to electronic communications being received in, and/or retrieved by, the centralized investigative data aggregation and analysis system.

6. The system of claim 5, wherein the alert enables the at least one person associated with the controlled-environment facility in which the subject communication originated to monitor the particular electronic communication, without knowledge of any party to the particular electronic communication.

7. The system of claim 1, wherein the particular data related to electronic communications is a particular telephone number dialed, or otherwise called.

8. The system of claim 1, wherein the particular data related to electronic communications is identification of a particular keyword.

9. The system of claim 1, wherein the particular data related to electronic communications is a particular controlled-environment facility resident trust account used to pay for the particular electronic communication.

10. The system of claim 1, wherein the particular data related to electronic communications is a personal identification number of a particular resident used to place the electronic communication.

11. The system of claim 1, wherein the particular data related to electronic communications is the particular electronic communication being made to a mobile communication device located within a defined geographic area.

12. The system of claim 1, wherein the particular data related to electronic communications is that the particular electronic communication is a resident-to-resident electronic communication.

13. A proactive multiple controlled-environment facility investigative data aggregation and analysis system implemented method comprising:
   accepting setup of alerts, each alert associated with particular data related to electronic communications associated with the alert and defined to be directed to at least one person not associated with a controlled-environment facility;
   receiving and/or retrieving, from at least one controlled-environment facility communications management system, by a centralized investigative data aggregation and analysis system, captured data related to electronic communications associated with each of a plurality of residents of one or more controlled-environment facilities; and
   alerting the at least one person not associated with the controlled-environment facility in response to the particular data related to electronic communications associated with the alert with respect to a particular electronic communication.

14. The method of claim 13, further comprising enabling, by the alert, the at least one person not associated with the controlled-environment facility to monitor the particular electronic communication, without knowledge of the particular resident and any other party to the particular electronic communication.

15. The method of claim 13, further comprising alerting, by the centralized investigative data aggregation and analysis system, at least one person associated with the controlled-environment facility in which an individual resident associated with the particular communication resides in response to same or different particular data related to electronic communications.

16. The method of claim 15, further comprising enabling, by the alert, the at least one person associated with the controlled-environment facility in which the individual resident resides to monitor the particular electronic communication, without knowledge of any party to the particular electronic communication.

17. The method of claim 13, wherein the particular data related to electronic communications is a particular telephone number dialed, or otherwise called.

18. The method of claim 13, wherein the particular data related to electronic communications is a keyword.

19. The method of claim 13, wherein the particular data related to electronic communications is a particular controlled-environment facility resident trust account used to pay for the particular electronic communication.

20. The method of claim 13, wherein the particular data related to electronic communications is a personal identification number used to place the electronic communication.

21. The method of claim 13, wherein the particular data related to electronic communications is the particular electronic communication being made to a mobile communication device located within a defined geographic area.

22. The method of claim 13, wherein the particular data related to electronic communications is that the particular electronic communication is a resident-to-resident electronic communication.

23. A tangible non-transitory computer-readable storage medium having program instructions stored thereon that, upon execution by a multiple controlled-environment facility investigative data aggregation and analysis system, cause the system to:
   accept setup of alerts, each alert associated with particular data related to electronic communications associated with an individual resident, and each alert defined to be directed to at least one person not associated with a controlled-environment facility in which an individual resident resides;
   receive or retrieve, from at least one controlled-environment facility communications management system, captured data related to electronic communications associated with each of a plurality of controlled-environment facility residents; and
   alert the at least one person not associated with the controlled-environment facility in which the individual resident resides in response to the particular data related to electronic communications associated with the individual resident being received in the centralized investigative data aggregation and analysis system with respect to a particular electronic communication.

* * * * *